June 24, 1930.  A. A. GLIDDEN ET AL  1,767,062
APPARATUS FOR MANUFACTURING INNER TUBES
Filed June 1, 1927   2 Sheets-Sheet 1
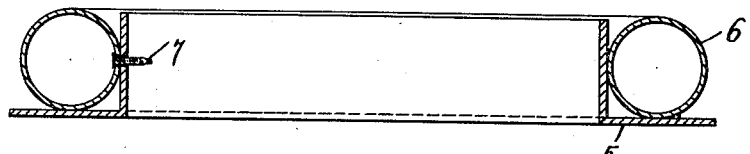
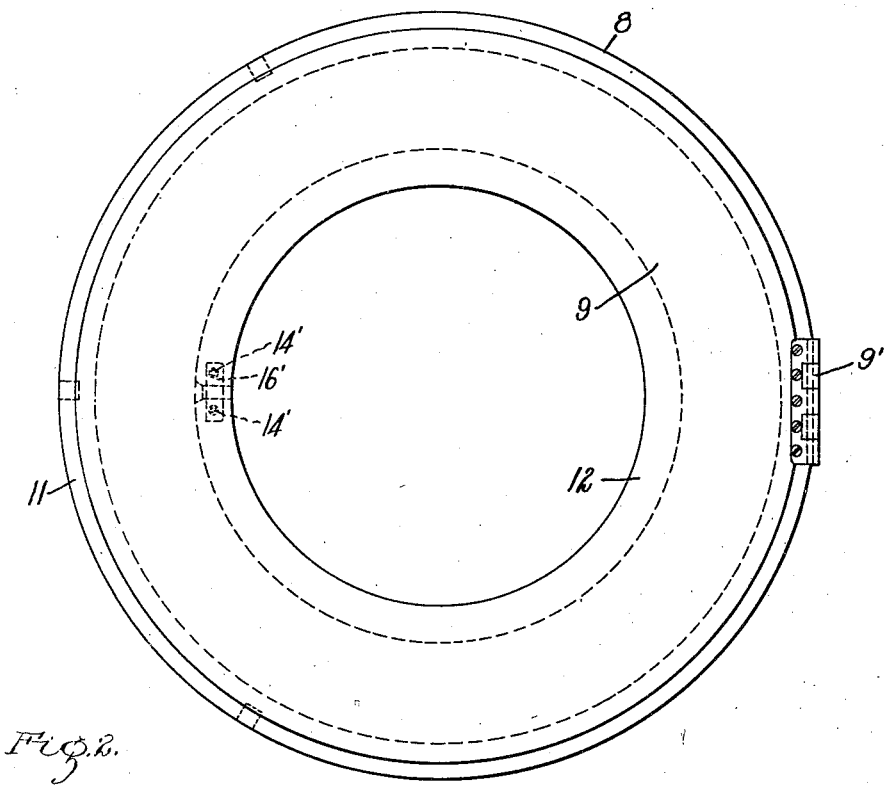
Inventors:
Alfred A. Glidden.
Thomas M. Knowland.
by Charles S. Gooding, Atty.

June 24, 1930.   A. A. GLIDDEN ET AL   1,767,062
APPARATUS FOR MANUFACTURING INNER TUBES
Filed June 1, 1927   2 Sheets-Sheet 2

Inventors:
Alfred A. Glidden.
Thomas M. Knowland.
by Charles S. Gooding,
Atty.

Patented June 24, 1930

1,767,062

UNITED STATES PATENT OFFICE

ALFRED A. GLIDDEN AND THOMAS M. KNOWLAND, OF WATERTOWN, MASSACHUSETTS, ASSIGNORS, BY MESNE ASSIGNMENTS, TO HOOD RUBBER COMPANY, INC., OF WILMINGTON, DELAWARE, A CORPORATION OF DELAWARE

APPARATUS FOR MANUFACTURING INNER TUBES

Application filed June 1, 1927. Serial No. 195,778.

This invention relates to an improved method of and apparatus for manufacturing inner tubes for automobile tires.

Heretofore molded tubes have been produced by forming the tube in any suitable manner, then placing it in a heated annular mold. Another method for manufacturing molded tubes which has been practiced for many years consists in placing the preformed tube in a mold similar to a tire mold, the whole being introduced into a pit vulcanizer and cured.

The disadvantage of the above methods lies in the fact that the tube while yet uncured comes in contact with the heated walls of the mold. A slight adhesion takes place at this point so that when the tube is inflated subsequent to vulcanizing, the expansion takes place locally, resulting in thin spots in the tube.

In the method of this invention the inner tube may be formed in any desirable manner, preferably a sheet of compounded rubber is run out on a calender. This sheeted rubber is then wrapped around a straight pole, preferably with two or more laps to form a splice. The rubber tube so formed has the valve base applied thereto and is then blown from the mandrel. The valve is then inserted and the cut ends of the tube spliced in any desired manner. The spliced tube is next placed upon an inflating ring and slightly inflated in order to bring its contour more nearly to that of the mold. The tube is then removed from the inflating ring and placed in an inner annular mold, and this inner mold is then put into an outer annular mold. The tube is then fully inflated and heat is applied to the outer mold.

After the tube has become cured, the inner mold is extracted and the tube removed and inspected. The tube is then fitted with bridge washer and a valve nut screwed down and is then in condition to be packed.

The inner mold referred to is so constructed as to fit into the cavity of the outer mold, there being a slight air gap between the two to allow for expansion of the metals and also to supply heat resistance. The advantage of this construction is that it allows the tube to be placed in a cool mold which is subsequently heated resulting in a more uniform thickness of tube as well as permitting a higher degree of acceleration in the compound. It is essential that the air gap between the two molds be approximately one thirty-second of an inch, otherwise insufficient room would be allowed for expansion of the metals, or else the heat resistance will be too high. To force heat through the air gap, a high temperature of the outer mold must be used, and for practical purposes it has been found that electricity is extremely desirable.

The invention consists in the improved method of and apparatus for manufacturing inner tubes hereinafter set forth in the specification and particularly pointed out in the claims.

Referring to the drawings:—

Figure 1 is a transverse section of an inflating ring with the tube which is to be cured and molded shown in connection therewith.

Fig. 2 is a plan view of the inner annular mold.

Like numerals refer to like parts throughout the several views of the drawings.

Figure 3:
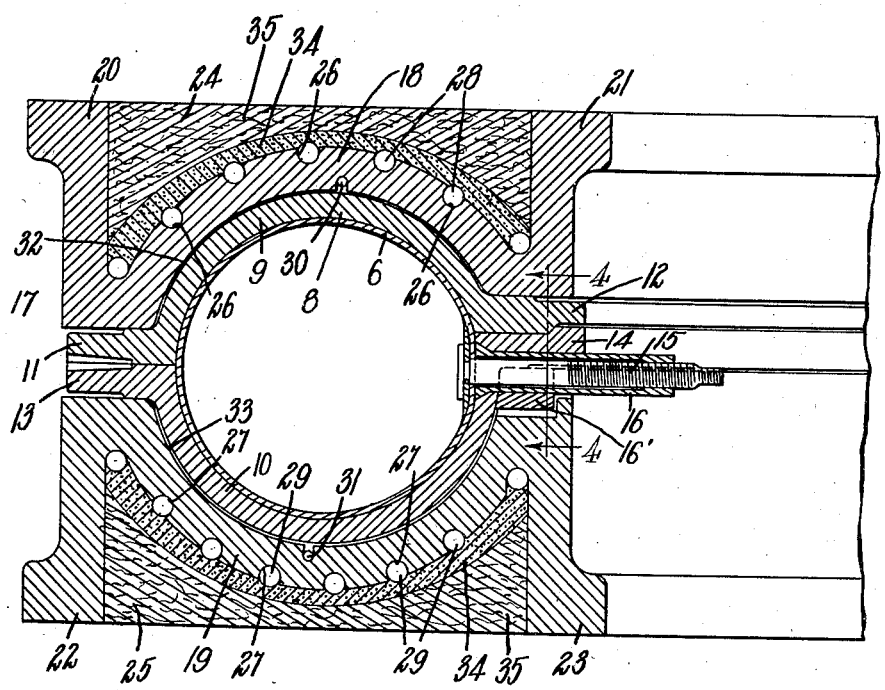
Fig. 3 is a transverse sectional elevation of the apparatus as a whole, illustrating the inner annular mold with an inner tube positioned therein, the inner annular mold being positioned within an outer annular mold.
Figure 4:
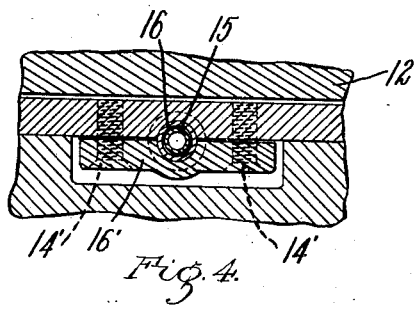
Fig. 4 is a detail section taken on line 4—4, Fig. 3.

In the drawings, 5 is an annular inflating ring, upon which is positioned an inner tube 6, which, while positioned upon the inflating ring, is partially inflated through its valve 7. An annular tubular inner mold 8 is illustrated in Figs. 2 and 3 and consists of two semi-tubular sections 9 and 10, hinged together at 9'. The section 9 has an outer flange 11 extending therearound and an inner flange 12 also extending therearound. The section 10 has an outer flange 13 and an inner flange 14 extending therearound.

The air valve 7 is fastened to the inner tube 6 and when in position in the mold it projects through a sleeve 16, which is held loosely in position on the flange 14 by a cap 16', fastened thereto by screws 14'. The valve stem 7 has screw-threaded engagement at 15 with the sleeve 16 so that by rotating the sleeve 16 the valve stem can be drawn toward the inner end thereof, thus bringing the inner tube 6 into contact with the inner end of the sleeve 16.

As shown in Fig. 3, the inner annular mold 8 is positioned within an outer annular mold 17, consisting of two semi-tubular sections 18 and 19. The section 18 is provided with an outer annular flange 20 and an inner annular flange 21, while the section 19 is provided with an outer annular flange 22 and inner annular flange 23. The flanges 20 and 21 and 22 and 23 constitute side walls of chambers 24 and 25. The sections 18 and 19 are provided with annular grooves 26 and 27 respectively, in which are positioned electric heating elements 28 and 29. The chambers 24 and 25 are filled with metal cement 34 and powdered magnesia 35.

It is essential that the heat supplied to the inner tube should be automatically controlled and maintained at a given temperature, and this is accomplished by temperature control bulbs 30 and 31 in a manner well known to those skilled in the art.

The control bulbs 30 and 31 are located as closely as possible to the object whose temperature is to be controlled, namely, the inner mold. The reason for locating the bulb in the location shown in Fig. 3 is that the heat supply should be cut off as soon as the temperature of the air between the inner and outer molds reaches the required maximum and so that no appreciable rise in temperature due to the residual specific heat of the outer mold will take place after the temperature control is shut off. If the control bulb were located in any other position than between the article to be heated and the source of heat, which consists of the heating elements, the temperature of the outer mold, and therefore of the inner mold and the tube therein, might continue to rise higher than the temperature indicated by the bulb. Furthermore, once the control has been disconnected and the temperature allowed to fall, it is possible that the temperature of the inner mold would fall to a much lower temperature than that indicated by the bulb. The bulb location shown is the only one possible where the bulb can be approximately half way between the tube and the heating elements without very seriously weakening the outer mold.

The mode of operation employed in carrying the method into effect is as follows:—The tube 6, after being partially inflated, is placed in the section 10 of the inner mold 8 with the valve stem 15 projecting through the sleeve 16, the section 9 of the inner mold having been thrown back on the hinge 9' in order to enable this to be done. The inner mold is then closed and the valve stem 15 is drawn outwardly by rotating the sleeve 16, which has screw-threaded engagement with it, in the proper direction. The inner mold is now placed in the section 19 of the outer mold and the section 18 of the outer mold is then placed in position as illustrated in Fig. 3, and the parts of the outer mold pressed toward each other by a suitable press, thus pressing the sections 9 and 10 of the inner mold firmly together along their flanged portions 11 and 13.

When the parts are assembled and under pressure, air spaces 32 and 33 are left between the sections 18 and 9 and the sections 19 and 10 of the outer and inner molds respectively.

In using an inner mold for curing tubes, it is necessary that it should fit the outer mold as nearly as possible so as to transmit an even temperature to all parts of the tube. It is also necessary that the inner mold should be as nearly as possible of the same thickness throughout for the same reason. It has been found that due to the expansion of the metal, it was impossible to introduce a cool inner mold into a heated outer mold where the inner mold fitted the outer mold when both molds were at the same temperature, that is, at a room temperature, or any high temperature. It is evident that where the outer mold is hot, say 375° F. and it is desired to introduce into the hot outer mold a cold inner mold, say 100° F., it would be necessary to have a space between the two molds to make up for this inequality of temperatures and allow the inner mold to expand. The best results have been obtained by allowing a space of about $\frac{1}{32}$ of an inch between the inner mold and the outer mold when they are assembled, and $\frac{1}{32}$ of an inch is the limit of allowance that can be made in order that heat shall be transmitted from the outer mold to the inner mold without great loss of time. On the other hand, it must be at least $\frac{1}{32}$ of an inch in order to take care of the difference in temperature of the inner mold when it is cold and being put into the outer mold, which is hot.

The inner tube 6 is now inflated to its full extent through the air valve contained within the valve stem 15 and the outer mold is heated through the electrical heating elements 28 and 29, thus causing the inner mold to be heated by heat transmitted from the outer mold, to the inner mold, through the intervening air spaces 32 and 33, and as the inner mold becomes heated the inner tube 6 is heated and the rubber compound of which it is composed is cured.

After the inner tube has thus been heated for the correct amount of time, approximately fifteen minutes, the pressure is removed from the outer mold, the section 18 is removed, and the inner mold is then removed from the outer mold and passed through a cooling tank. After the inner mold has thus become cooled, the inner tube is removed and tested for leaks.

We claim:

1. A mold having, in combination, an inner member provided with a core to receive an article to be molded, an outer member provided with a core to receive said inner member, the inner and outer members being spaced apart and forming an air space therebetween, and means to heat said outer member independently of said inner member, whereby heat from said outer member may be transmitted through said air space to said inner member.

2. A mold having, in combination, an inner member provided with a core to receive an article to be molded, an outer member provided with a core to receive said inner member, the inner and outer members being spaced apart and forming an annular air space of approximately the same thickness throughout, and means to heat said outer member independently of said inner member whereby heat from said outer member may be transmitted through said air space to said inner member.

3. A mold having, in combination, an inner member provided with a core to receive an article to be molded, an outer member provided with a core to receive said inner member, the inner and outer members being spaced apart and forming an air space therebetween, and means to heat said outer member embodied within the material of said outer member and separated thereby from said inner member.

4. A mold having, in combination, an inner member provided with a core to receive an article to be molded, an outer member provided with a core to receive said inner member, the inner and outer members being spaced apart and forming an air space therebetween, means to heat said outer member independently of said inner member, whereby heat from said outer member may be transmitted through said air space to said inner member, and heat control bulbs interposed between said inner and outer members.

In testimony whereof we have hereunto set our hands.

ALFRED A. GLIDDEN.
THOMAS M. KNOWLAND.